(12) United States Patent
Wright

(10) Patent No.: US 10,679,195 B2
(45) Date of Patent: Jun. 9, 2020

(54) METHOD AND DEVICE FOR PROCESSING ELECTRONIC PAYMENT INSTRUCTIONS

(71) Applicant: IPCO 2012 Limited, London (GB)

(72) Inventor: John Christopher Wright, London (GB)

(73) Assignee: IPCO 2012 Limited, London (GB)

(*) Notice: Subject to any disclaimer, the term of this patent is extended or adjusted under 35 U.S.C. 154(b) by 499 days.

(21) Appl. No.: 15/319,124

(22) PCT Filed: Jun. 10, 2015

(86) PCT No.: PCT/GB2015/051706
§ 371 (c)(1),
(2) Date: Dec. 15, 2016

(87) PCT Pub. No.: WO2015/193643
PCT Pub. Date: Dec. 23, 2015

(65) Prior Publication Data
US 2017/0132587 A1  May 11, 2017

(30) Foreign Application Priority Data

Jun. 19, 2014  (GB) .................................. 1410981.3

(51) Int. Cl.
*G06Q 20/10* (2012.01)
*G06F 16/22* (2019.01)
(Continued)

(52) U.S. Cl.
CPC ............. *G06Q 20/10* (2013.01); *G06F 16/22* (2019.01); *G06Q 20/023* (2013.01); *G06Q 20/389* (2013.01)

(58) Field of Classification Search
USPC ........................................................ 705/39
See application file for complete search history.

(56) References Cited

U.S. PATENT DOCUMENTS 5,060,185 A  10/1991 Naito et al.
5,343,477 A   8/1994 Yamada
(Continued)

FOREIGN PATENT DOCUMENTS

EP   1 326 192 A1    7/2003
GB   2 333 878 A     8/1999
WO   WO 89/09452 A1 10/1989

OTHER PUBLICATIONS

Office Action dated Jun. 20, 2018 in the corresponding European Application No. 15 729 903.3.
(Continued)

*Primary Examiner* — Robert R Niquette
(74) *Attorney, Agent, or Firm* — Oblon, McClelland, Maier & Neustadt, L.L.P.

(57) ABSTRACT

A method of processing a payment instruction including: receiving a payment instruction from a user, the payment instruction including payment details and an electronic signature, the electronic signature being destroyed if the content of payment instruction is altered; checking presence of the electronic signature and confirming integrity of the payment instruction when the electronic signature is present; wherein in event the integrity of the payment instruction is confirmed, the method: i) stores the payment instruction in a first storage unit using a relational database management system (RDBMS); ii) replicates the payment instruction and stores the replicated payment instruction in a second storage unit using the RDBMS; and iii) transmits an acknowledgement signal to the user once the payment instruction has been successfully stored in the first storage unit and the replicated payment instruction has been successfully stored in the second storage unit.

2 Claims, 6 Drawing Sheets

(51) Int. Cl.
*G06Q 20/02* (2012.01)
*G06Q 20/38* (2012.01)

(56) References Cited

U.S. PATENT DOCUMENTS

| | | | |
|---|---|---|---|
| 6,098,053 A | 8/2000 | Slater | |
| 2003/0212632 A1* | 11/2003 | Keogh | G06Q 20/02 705/40 |
| 2004/0034596 A1* | 2/2004 | Light | G06Q 20/04 705/40 |
| 2004/0039888 A1* | 2/2004 | LeCrone | G06F 11/2076 711/162 |
| 2011/0119189 A1* | 5/2011 | Clayton | G06Q 10/06 705/44 |
| 2013/0204775 A1* | 8/2013 | Midkiff | G06Q 20/10 705/39 |
| 2013/0254111 A1* | 9/2013 | Gonser | G06Q 20/3825 705/44 |

OTHER PUBLICATIONS

Office Action dated Dec. 14, 2018 in the corresponding European Application No. 15 729 903.3 11 pages.
Office Action dated Feb. 14, 2019 in the corresponding Austrian Application No. A 8002/2018.

* cited by examiner

METHOD AND DEVICE FOR PROCESSING ELECTRONIC PAYMENT INSTRUCTIONS

BACKGROUND

Field of the Disclosure

The present invention relates to a method and device for automatically processing payment instructions.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention.

An electronic payment instruction is information issued by a sender in an electronic payment system to instruct the withdrawal of funds in a first bank account and a corresponding deposit of funds in a second bank account. The net result is a transfer of funds (or payment transaction) from the first bank account to the second bank account. Because the first and second bank accounts may exist with different financial institutions, the payment instruction is initially stored and processed centrally. The result of the central processing is that the payment instruction is converted into one or more further instructions which are then sent to one or more financial institutions in order to complete the payment transaction.

It is very important that all payment transactions which have been instructed are carried out correctly. In other words, it is very important that all the payment transactions which have been instructed by the sender are carried out and that each transaction is carried out only once. This ensures that there is no discrepancy between payment transactions which have been instructed and the actual transactions which take place. One way to ensure this is to check with the sender of the payment instruction that the transaction has taken place successfully. However, there are often very large numbers of payment instruction senders, thus making it impractical to check this with each sender individually. An aim of embodiments of the present invention is therefore to provide a faster, more efficient way of ensuring that payment transactions which have been instructed electronically are carried out correctly.

SUMMARY

In one aspect, the present invention provides a method of processing a payment instruction, comprising: receiving a payment instruction from a user, the payment instruction comprising payment details and an electronic signature, the electronic signature being destroyed if the content of payment instruction is altered; checking the presence of the electronic signature and confirming the integrity of the payment instruction when the electronic signature is present; wherein in the event that the integrity of the payment instruction is confirmed, the method comprises: i) storing the payment instruction in a first storage unit using a relational database management system (RDBMS); ii) replicating the payment instruction and storing the replicated payment instruction in a second storage unit using the RDBMS; and iii) transmitting an acknowledgement signal to the user once the payment instruction has been successfully stored in the first storage unit and the replicated payment instruction has been successfully stored in the second storage unit.

Advantageously, embodiments of the present invention ensure, as far as possible, that the payment instruction as issued by the user is the same as that received, stored and replicated. This is because the use of the electronic signature ensures integrity of payment instruction upon receipt. It is also because the use of the RDBMS allows the payment instruction to be replicated and the original and replicated payment instructions to be stored with a reduced amount of processing when compared to alternative methods. As well as increasing the speed of the payment instruction duplication and storage process, importantly, the reduced amount of processing also means that the likelihood of introducing errors into the stored payment instructions is reduced. This is desirable as it is impractical and inefficient from a network perspective to contact the large number of users (which could be many tens of thousands) after their payment instructions have been stored so as to check if any errors have been introduced in any of the payment instructions. In other words, the required bandwidth and data traffic over the network is reduced when compared to having to contact the user to check if errors in the payment instruction have occurred. It also helps alleviate the problem of having to wait for users to manually confirm that their payment instruction has been correctly received and stored, such manual responses often being subject to delay at the user end.

Embodiments may include the steps of: determining whether or not the payment instruction stored in the first storage unit is available; when the payment instruction stored in the first storage unit is available, extracting the payment instruction from the first storage unit and performing further processing on the payment instruction; and when the payment instruction stored in the first storage unit is not available, extracting the replicated payment instruction from the second storage unit and performing the further processing on the replicated payment instruction.

Thus, if the payment instruction stored at the first storage unit becomes unavailable (through deletion or corruption in the first storage unit or a natural disaster at the geographic location of the first storage unit, for example), the replicated payment instruction stored in the second storage unit is used. Advantageously, the chance of a payment transaction not being carried out due to unavailability at the first storage unit is therefore significantly reduced. Payment transactions can thus be carried out correctly without the need to manually perform checks with the large numbers of users who create payment instructions, which is time consuming and inefficient from a network perspective due to the increase in data sent over the network.

Embodiments may include the steps of: determining whether or not a fault has occurred in the further processing; and when a fault is determined to have occurred, cancelling the further processing, newly extracting the payment instruction from the first storage unit or replicated payment instruction from the second storage unit, and restarting the further processing on the newly extracted payment instruction or replicated payment instruction.

Thus, any errors that occur during the further processing of the payment instruction can be easily rectified by simply cancelling the further processing for the payment instruction and restarting it. This is possible because the original and replicated payment instructions themselves remain stored in the first and/or second storage units and have been subjected to only a small amount of processing strictly necessary to check and safely store the payment instruction in the RDBMS. The stored payment instructions therefore have high integrity and are unlikely to be corrupted in at least one of the first or second storage units, even in the case of a failure during the further processing. It is therefore possible to simply cancel faulty further processing and restart it using one of the original and replicated stored payment instructions, thus easily avoiding any complications caused by erroneous further processing of the payment instruction.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
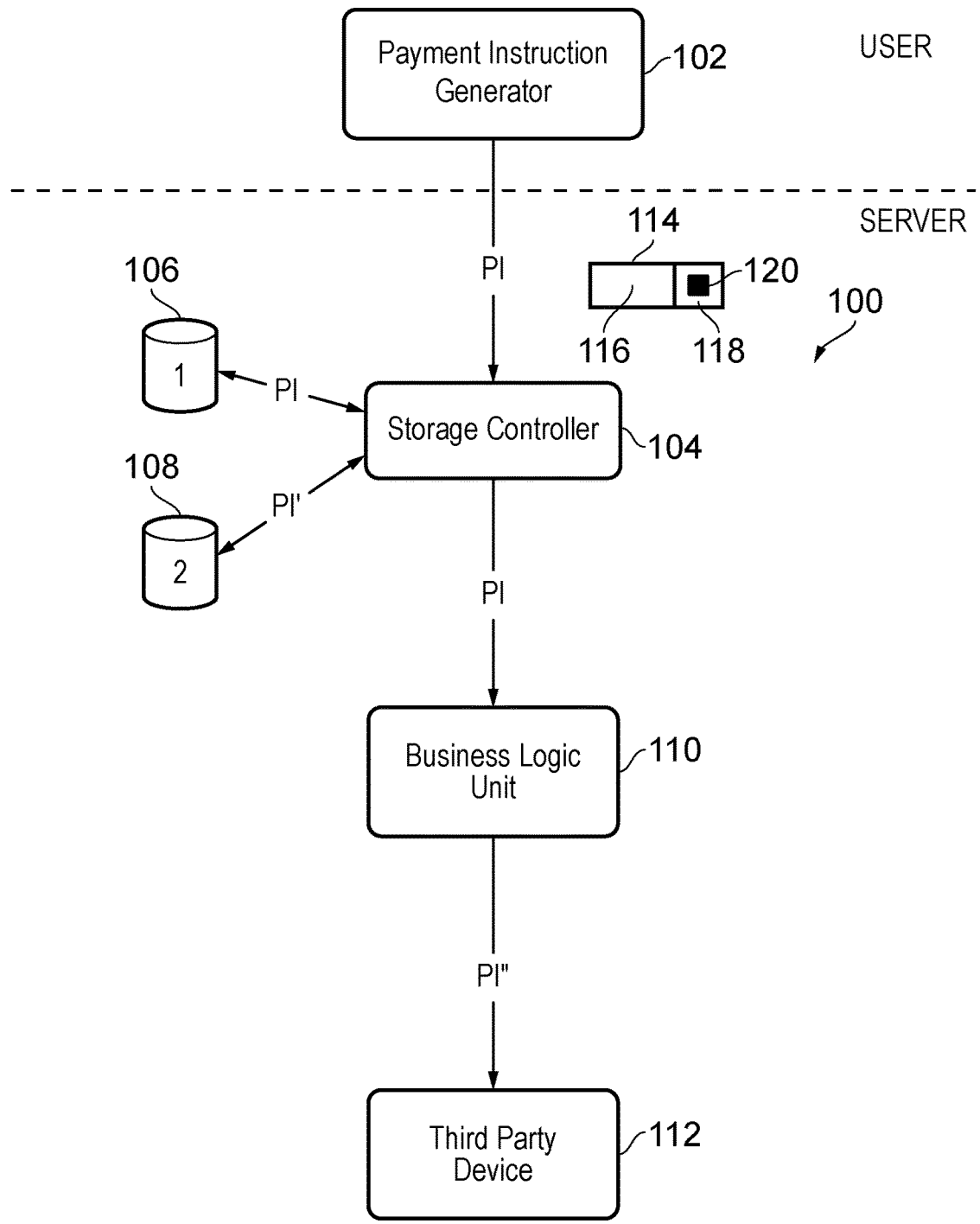
FIG. 1 describes a system for processing a payment instruction according to an embodiment of the present invention.

Referring now to the drawings, wherein like reference numerals designate identical or corresponding parts throughout the several views.

FIG. 1 describes a system 100 for processing a payment instruction according to an embodiment of the present invention.

The system 100 comprises a payment instruction generator 102, storage controller 104, first storage unit 106, second storage unit 108, business logic unit 110 and third party device 112. Although only one payment instruction generator 102 is shown in FIG. 1, in reality there are many payment instruction generators all connected to the storage controller 104. Specifically, a payment instruction generator 102 is provided for each customer (or sender) requiring a bank transfer to be created. In the following description and for brevity only a single payment instruction generator 102 will be described.

The payment instruction generator 102 generates an electronic payment instruction PI in response to a request from a party (such as an individual person or company) that has access to the payment instruction generator 102. The payment instruction generator 102 may be any kind of software suitable for generating a payment instruction. For example, it may be payroll software for generating a set of Bacs payment instructions for staff salaries. Suitable software includes, but is not limited to, AccessPay or the like.

The electronic payment instruction PI is a data packet 114 which comprises a data portion 116 and a signature portion 118. Although this data packet 114 contains payment information, the invention is not so limited and any kind of data packet is also envisaged. In fact, the invention is applicable to any kind of data packet whose integrity must be checked and that must be processed only once.

The data portion 116 contains payment information. The payment information comprises information required in order for a payment transaction to take place. For example, the payment information comprises details of the bank account of the payer, details of the bank account of the payee, the amount of payment (in pounds sterling or US dollars, for example), the date that the payment transaction should take place, etc. Any other suitable information may be included in the payment information.

The signature portion 118 comprises an electronic signature 120 which is used to authenticate and confirm the integrity of the payment instruction when it is transmitted. In other words, the electronic signature allows a recipient of the payment instruction to authenticate the sender of the payment instruction to confirm the identity of the sender and also allows the recipient to detect whether the payment instruction has been tampered with in any way and thus confirming the integrity of the payment instruction. If the payment instruction has been tampered with in any way, then this is evident because the electronic signature is destroyed. Any suitable electronic signature may be used consistent with the message standard appropriate to the data packets used to transmit the payment instruction. For example, the payment instruction may use the Bacs Standard 18 payment instruction format and may use an electronic signature derived from a public/private key technology such as the RSA algorithm and x.509 certificate.

Once the payment instruction PI has been generated by the payment instruction generator 102, it is transmitted to the storage controller 104. The storage controller 104 is, in embodiments, located in an Automated Clearing House (ACH). The storage controller 104 is typically embodied as computer program code running on a server. This transmission may occur via any suitable means, such as over a computer network. In the case that a computer network is used, a secure communications protocol may be used to reduce the chance of interception and/or tampering of the payment instruction. For example, the Hypertext Transfer Protocol Secure (HTTPS) protocol could be used.

When the storage controller 104 has received the payment instruction PI, the electronic signature is checked so as to authenticate the payment instruction and ensure its integrity. The original payment instruction is then stored in the first storage unit 106. The payment instruction is also replicated so as to produce a replicate payment instruction PI'. It is important that the integrity of the original payment instruction is maintained when stored in the first storage unit 106. In order to reduce the likelihood of the integrity of the original payment instruction being compromised, the original payment instruction should have very little processing performed on it. It is particularly important to maintain integrity of the original payment instruction because it is impractical to resolve any queries relating to the integrity once stored. This is because it is impractical and inefficient in terms of network resource and because of the inevitable delays in response from the original submitters to contact the payment instruction generator 102 after storage of the original payment instruction, especially when a large number of users (which could be many tens of thousands) are generating payment instructions. The mechanism to achieve this result will be explained below. The replicated payment instruction PI' is then stored in the second storage unit 108.

The replicated payment instruction PI' contains exactly the same data as the original payment instruction PI. The mechanism for replicating the payment instruction will also be explained later. The first and second storage units 106, 108 each comprise any suitable device for storing the payment instructions PI, PI' as electronic data. For example, the first and second storage units 106, 108 could each comprise one of a hard disk drive (HDD), solid state drive (SSD), tape drive or the like.

Once the payment instructions PI, PI' have been stored, when, at a later time, it is decided that the payment transaction should proceed, one of the payment instructions PI, PI' is transmitted to the business logic unit 110. In other words, the storage controller 104 and the business logic unit 110 communicate asynchronously so that the storage controller 104 passes the payment instruction PI, PI' only when required. As will be explained in more detail later on, in general, the payment instruction PI stored in the first storage unit 106 will be transmitted. However, if the payment instruction PI stored in the first storage unit 106 becomes unavailable for any reason, then the replicated payment instruction PI' will be transmitted instead. In the example embodiment given in FIG. 1, it can be seen that, in this case, it is the original payment instruction PI which is transmitted.

The business logic unit 110 performs business logic processing on the received payment instruction PI, PI' so as to generate one or more outbound payment instructions PI" which are then transmitted to a third party device 112. The business logic processing is a form of further processing on the payment instruction PI, PI'. Typically, the third party devices will be controlled, respectively, by financial institutions which use the further instructions PI" generated by the business logic unit 110 to complete the payment transaction. The specific business logic processing contained within the business logic unit 110 could be any business process. As this is not particularly relevant to the embodiment the specific business logic will not be described in detail.

Figure 2:
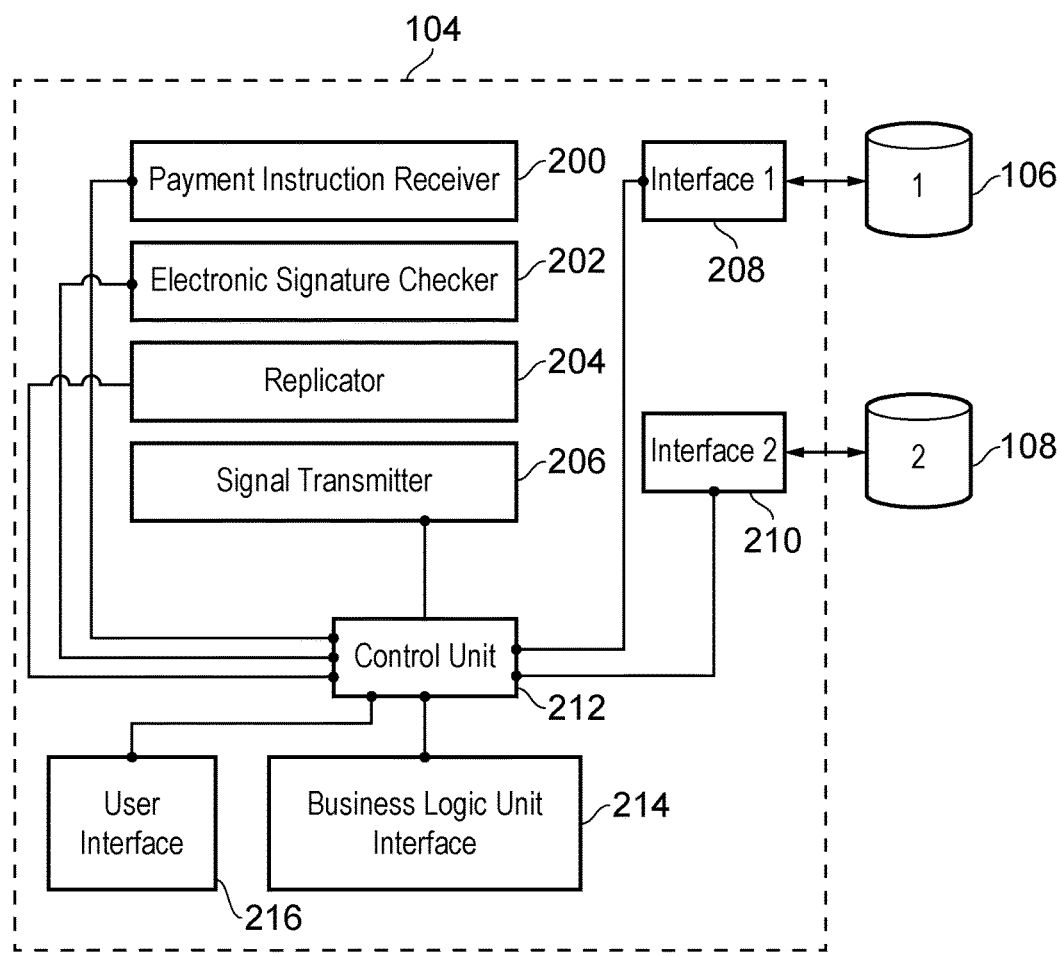
FIG. 2 describes a storage controller according to an embodiment of the present invention.

FIG. 2 describes the storage controller 104 according to an embodiment of the present invention. The storage controller 104 comprises a payment instruction receiver 200, electronic signature checker 202, replicator 204, signal transmitter 206, business logic unit interface 214, first interface 208, second interface 210 and user interface 216. Each of these components are connected to a control unit 212 which controls the operation of each of the components.

The operation of the storage controller 104 is therefore controlled by the control unit 212.

The payment instruction receiver 200 receives the payment instruction PI from the payment instruction generator 102 of the sender. As already mentioned, the payment instruction PI may be received over a computer network using, for example, the HTTPS protocol.

The electronic signature checker 202 then checks the electronic signature 120 of the payment instruction using a method appropriate to the electronic signature which has been used. In this way, the payment instruction is authenticated and its integrity is confirmed. It is noted here that, in the case that the payment instruction cannot be authenticated and/or that the integrity of the payment instruction cannot be confirmed, further processing of the payment instruction PI is cancelled and an error message is transmitted back to the sender using the signal transmitter 206.

Once the payment instruction PI has been authenticated and its integrity has been confirmed, the payment instruction PI is replicated by the replicator 204 so as to produce the replicated payment instruction PI'. The original payment instruction PI is then transmitted to the first storage unit 106 via the first interface 208. Similarly, the replicated payment instruction PI' is transmitted to the second storage unit 108 via the second interface 210.

The duplication and storage of the payment instructions PI is carried out using a reliable relational database management system (RDBMS). For example, the Oracle® RDBMS could be used. Advantageously, this allows the payment instruction PI to be replicated and the original and replicated payment instructions PI, PI' to be stored with a reduced amount of processing when compared to alternative methods. As well as increasing the speed of the payment instruction duplication and storage process, importantly, reducing the amount of processing to that strictly necessary to check and safely store the payment instructions also means that the likelihood of introducing errors through the actions of checking and storing the payment instructions PI, PI' is reduced. In other words, the likelihood of the integrity of the payment instruction being maintained is improved. As stated above, this is desirable as it is impractical and inefficient from a network perspective to contact the payment instruction generator 102 after the payment information has been stored for the large number of users which may generate a payment instruction at a payment instruction generator. It also helps alleviate the problem of having to wait for users to manually confirm that their payment instruction has been correctly received and stored, such manual responses often being subject to delay at the user end. The use of the RDBMS in replicating and storing the payment instructions means that either of the original or replicated payment instructions PI, PI' may be used for the later business logic processing and that, in either case, the payment transaction will thus be processed correctly. It is noted that the RDBMS used may have transaction atomicity and replication capabilities.

Once the payment instructions PI, PI' have been successfully stored in the first and second storage units 106, 108, an acknowledgement signal is transmitted by the signal transmitter 212 to the sender so as to inform the sender that the payment instruction PI has been successfully received and stored. This acknowledgment is only sent after the payment instructions PI, PI' have been stored.

The storage units 106, 108 are functionally separated from each other so that, in the case of a failure of the first storage unit 106 which results in deletion or corruption of the stored original payment instruction PI (due to, for example, a technical fault of the first storage unit 106), the stored replicated payment instruction PI' in the second storage unit 108 is unaffected and can be used for the further business logic processing in place of the original payment instruction PI. The storage units 106, 108 may be located in different geographical locations from each other so as to ensure that a failure of the first storage unit 106 which is caused by, for example, a natural or man-made disaster (such as fire, flooding, etc.) is less likely to also affect the second storage unit 108.

Thus, through the creation of the replicated payment instruction PI' and the storage of both the original and replicated payment instructions PI, PI' in the separate first and second storage units 106, 108 using the RDBMS, the storage controller 104 allows two copies of the payment instruction PI, each of which has been subjected to a amount of processing strictly necessary to check and safely store the payment instruction, to be stored. If the copy stored at the first storage unit 106 becomes unavailable (through deletion or corruption at the first storage unit 106 or the unavailability of the first storage unit 106 because of a communication breakdown or disaster), the second copy stored at the second storage unit 108 can be used. Overall, the chance of a payment transaction not being carried out (due to deletion or corruption of the payment instruction PI at one of the storage units 106, 108) or being carried out incorrectly (due to errors introduced into the payment instruction PI during storage and/or duplication) is therefore significantly reduced. Payment transactions can thus be carried out correctly without the need to manually perform checks with the large numbers of users who create payment instructions, which is time consuming and inefficient from a network perspective due to the increase in data sent over the network.

Figure 3:
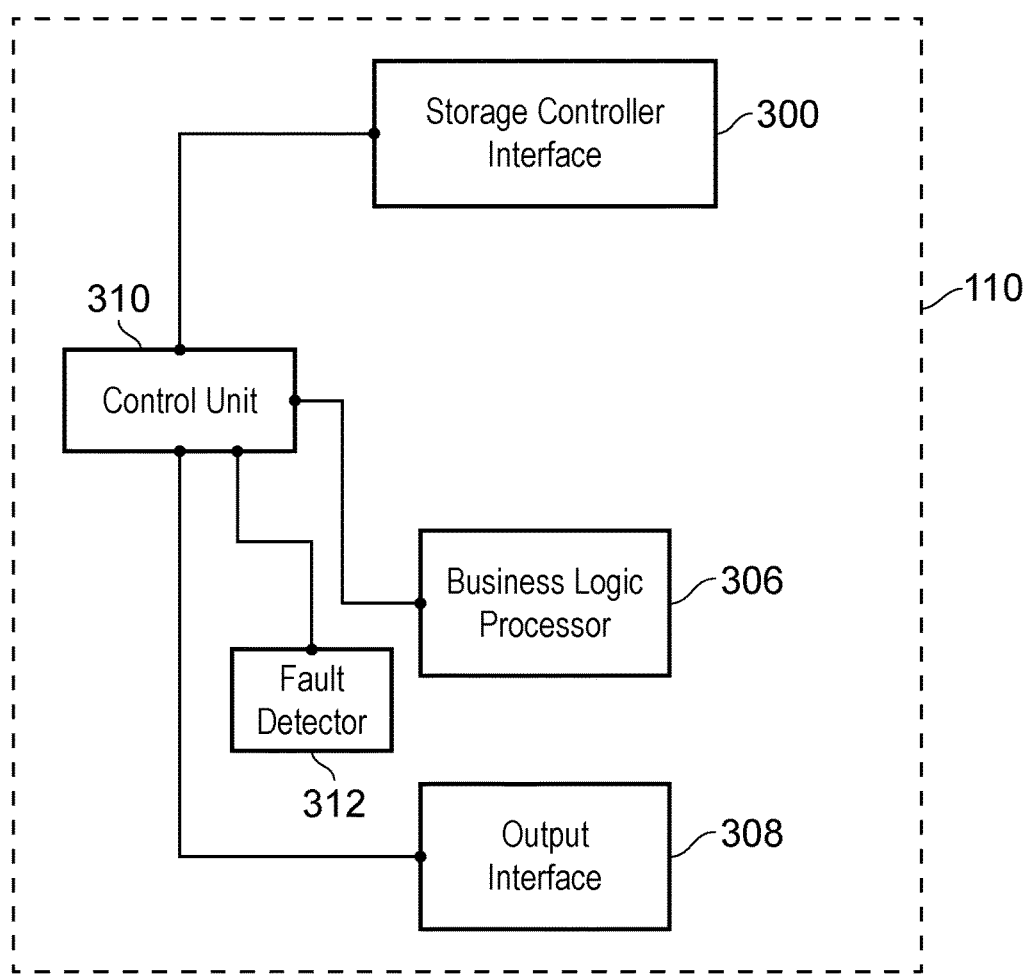
FIG. 3 describes a business logic unit according to an embodiment of the present invention.

FIG. 3 describes the business logic unit 110 according to an embodiment of the present disclosure. The business logic unit 110 comprises a storage controller interface 300, business logic processor 306, fault detector 312 and output interface 308. Each of these components are connected to a control unit 310 which controls the operation of each of the components.

The operation of the business logic unit 110 is therefore controlled by the control unit 310.

The storage controller interface 300 performs data communication with the business logic unit interface 214 of the storage controller 104 so as to enable data to be transmitted between the storage controller 104 and business logic unit 110. This data communication may occur over a computer network, for example or over a Wide Area Network, such as the Internet.

The control unit 212 of the storage controller 104 determines whether the original payment instruction PI stored in the first storage unit 106 or replicated payment instruction PI' stored in the second storage unit 108 should be transmitted to the business logic unit 110 for carrying out the business logic processing. More specifically, the control unit 212 first determines whether the original payment instruction PI stored in the first storage unit 106 is available. If the original payment instruction PI is available, then the control unit 212 causes the payment instruction PI from the first storage unit 106 to be extracted and transmitted to the business logic unit 110. On the other hand, if the original payment instruction is not available (for example, through a technical fault with the first storage unit 106), then the control unit 212 causes the replicated payment instruction PI' from the second storage unit 108 to be extracted and transmitted to the business logic unit 110.

The determination operation of the control unit 212 may be carried out on a manual or automatic basis.

In the manual operation, the control unit 212 is manually controlled so as to select either the first storage unit 106 or second storage unit 108. This manual control takes place via the user interface 216, which provides the user with a way of selecting one of the first storage unit 106 or second storage unit 108. The user interface 216 may comprise, for example, electronic buttons, a display together with a keyboard and/or mouse, a touch screen or the like. Thus, if a problem occurs at the first storage unit 106 (for example, a technical fault that leads to the corruption of data, or even a natural disaster such as a fire or flood), then the control unit 212 can be manually controlled so as to select extraction from the second storage unit 108.

In the automatic operation, standard methods may be used for the control unit 212 to automatically detect occurrences in the first storage unit 106 which result in a risk that the data stored in the first storage unit 106 may be deleted or corrupted (for example, detection of software or hardware errors related to the first storage unit 106). In the case that one of these occurrences is detected, the control unit 212 selects the second storage unit 108.

When the control unit 212 of the storage controller 104 has selected either the payment instruction PI stored in the first storage unit 106 or the payment instruction PI' stored in the second storage unit 108, the selected payment instruction PI, PI' is extracted and transmitted to the business logic unit 110. That is, in the case that the first storage unit 106 is selected, the control unit 212 causes the payment instruction PI stored in the first storage unit 106 to be transmitted to the business logic unit 110. On the other hand, in the case that the second storage unit 108 is selected, the control unit 212 causes the payment instruction PI' stored in the second storage unit 108 to be transmitted to the business logic unit 110. The chosen payment instruction PI, PI' is received by the storage controller interface 300 of the business logic unit 110 and translated by the business logic processor 110 so as to generate the one or more further instructions PI". The one or more further instructions PI" are output to a third party device 112 via the output interface 308.

Thus, with the present invention, the business logic processing may be carried out by the business logic processor 306 of the business logic unit 110 on either the payment instruction PI or the replicated payment instruction PI' so as to complete the payment transaction. Therefore, even if one of the copies of the payment instruction PI, PI' becomes lost or corrupted, the payment transaction can still take place reliably.

Figure 4:
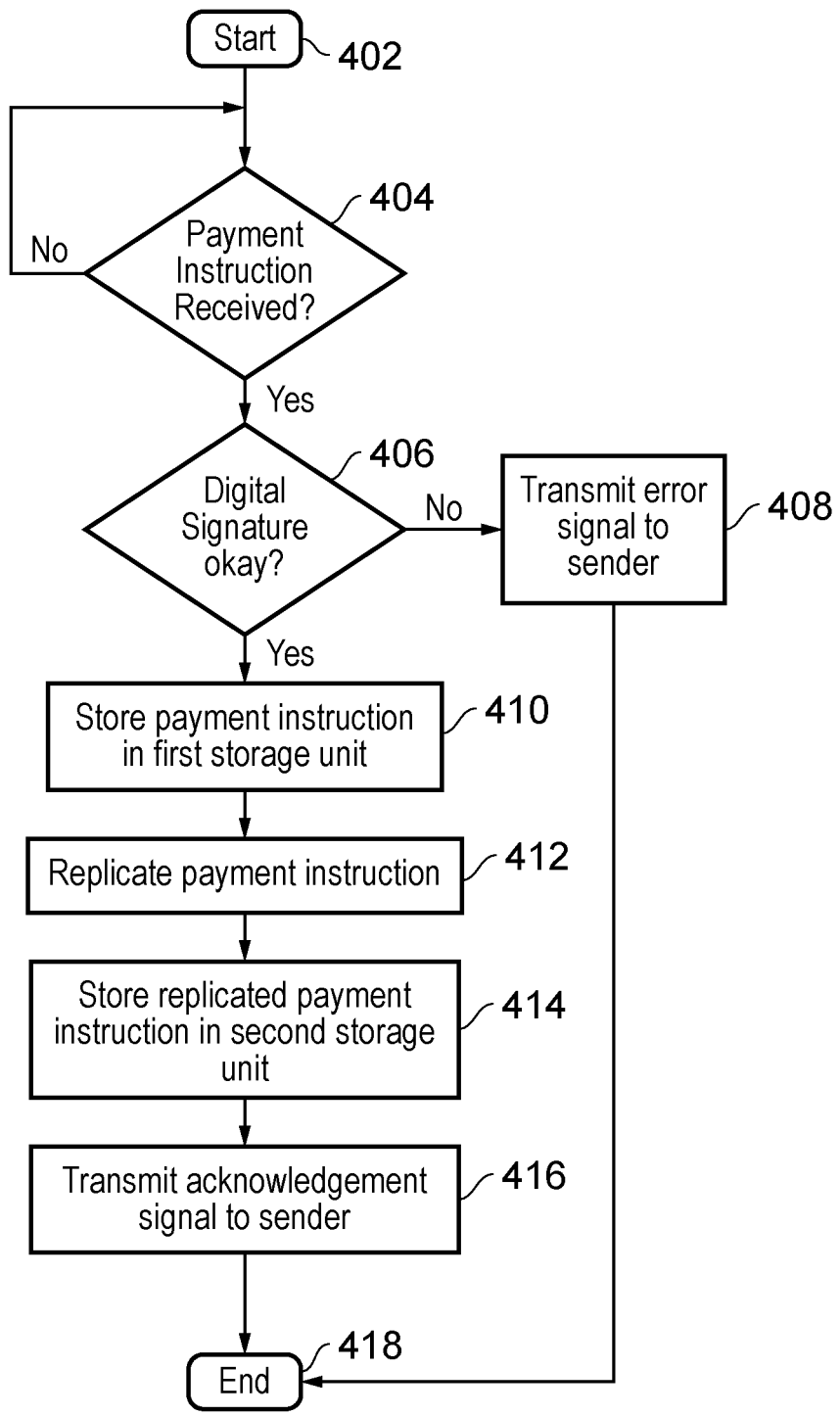
FIG. 4 describes a process for storing and replicating a payment instruction according to an embodiment of the present invention.

FIG. 4 describes the process carried out by the storage controller 104 for storing and replicating a payment instruction PI according to an embodiment of the present invention.

The process starts at step 402. At step 404, it is determined whether or not a payment instruction has been received. If a payment instruction PI has not been received, then the process returns to the beginning of step 404. On the other hand, if a payment instruction PI has been received, then the process moves onto step 406.

At step 406, the electronic signature 118 of the payment instruction is checked so as to authenticate the payment instruction and ensure its integrity. If the outcome of this check of the electronic signature is negative (implying that there is doubt as to the sender of the payment instruction or that the payment instruction has been tampered with or has become corrupted in transmission or receipt), then the process moves onto step 408, in which an error message is transmitted to the sender via the signal transmitter 206. The process then ends at step 418. On the other hand, if the outcome of this check of the electronic signature is positive (implying that the payment instruction is authenticated and that the payment instruction has not been tampered with and is uncorrupted), then the process moves onto step 410.

At step 410, the payment instruction PI is stored in the first storage unit 106. At step 412, the payment instruction PI is replicated so as to produce replicated payment instruction PI'. At step 414, the replicated payment instruction PI' is stored in the second storage unit 108. At step 416, an acknowledgement signal is transmitted to the sender via the signal transmitter 206. The acknowledgement signal informs the sender that the payment instruction has been successfully received and stored. The process then ends at step 418.

Figure 5:
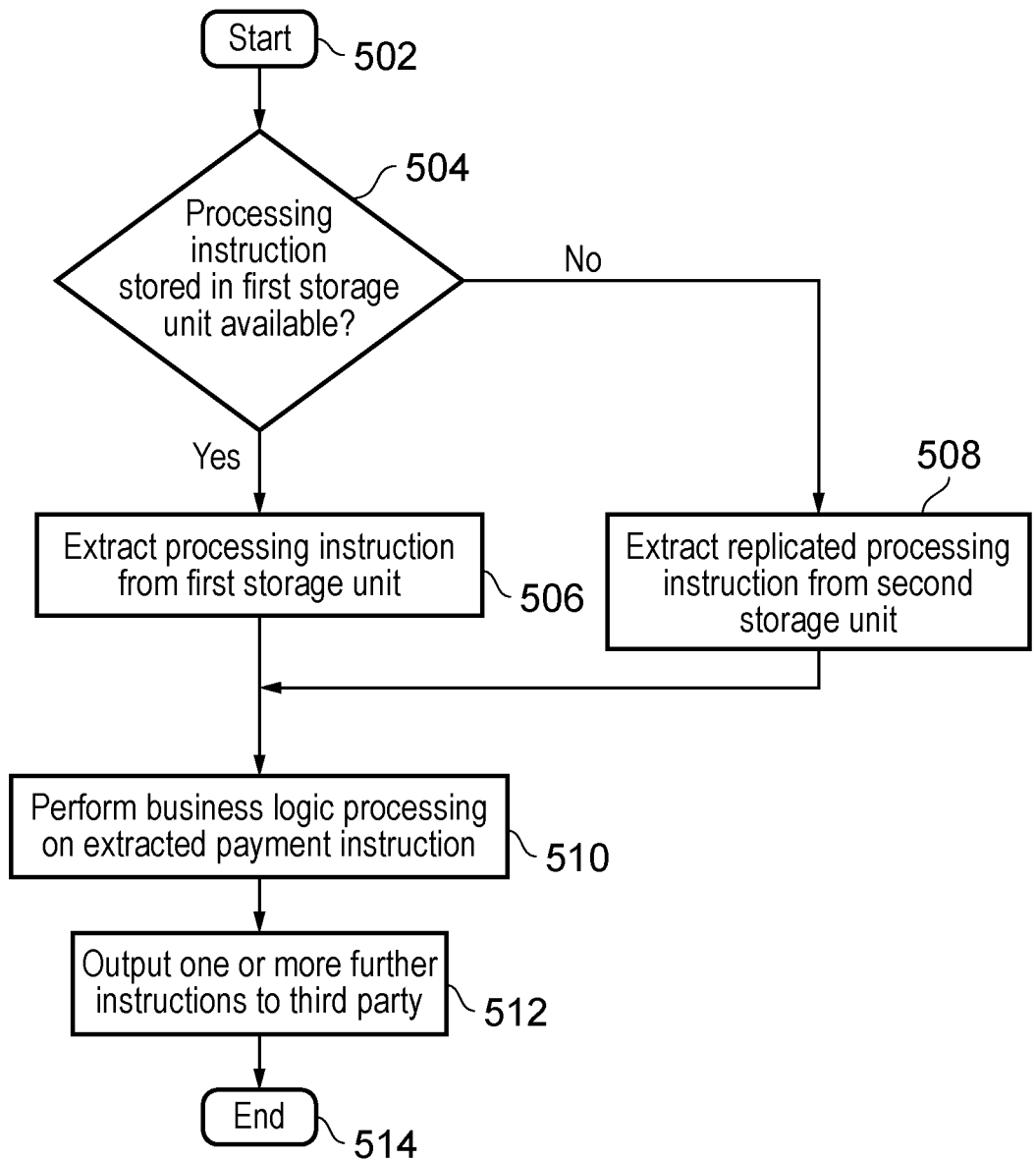
FIG. 5 describes a process for extracting and applying business logic processing to a stored payment instruction according to an embodiment of the present invention.

FIG. 5 describes the process for extracting and applying business logic processing to a stored payment instruction PI, PI' according to an embodiment of the present invention.

The process starts at step 502. At step 504, it is determined whether or not the processing instruction PI stored in the first storage unit 106 is available. If the processing instruction PI is available, then the process moves onto step 506, in which the processing instruction PI is extracted from the first storage unit 106. On the other hand, if the processing instruction PI is not available, then the process moves onto step 508, in which the replicated processing instruction PI' is extracted from the second storage unit 108.

The process then moves onto step 510, in which business logic processing is performed on the extracted payment instruction PI, PI'. To be clear, if the payment instruction PI is extracted at step 506, then the business logic processing is performed on the payment instruction PI. On the other hand, if the payment instruction PI' is extracted at step 508, then the business logic processing is performed on the payment instruction PI'. At step 512, one or more further instructions PI" are output. The one or more further instructions PI"" are the result of the business logic processing being performed on the payment instruction PI, PI'. The process then ends at step 514.

Although the above mentioned embodiments have been described as processing only a single payment instruction PI, it is also possible that a batch of multiple payment instructions PI is processed. In fact, this is very common for this kind of system, where payment instruction senders are often large organisations with many customers, employees, etc. for whom payments must be processed (for example, it may be a batch of monthly salary payments of all company employees which is instructed).

In the case of a batch of payment instructions, the replication and storage of all payment instructions in the batch is completed before the extraction and business logic processing of the batch is started. In other words, the replication and storage processing embodied by FIG. 3 and the extraction and business logic processing embodied by FIG. 4 are kept as two distinct, asynchronous processing stages for the batch of payment instructions. During the first stage, the storage controller 104 processes each payment instruction PI in the batch so as to store it in the first storage unit 106, replicate it so as to produce a replicated payment instruction PI', and store the replicated payment instruction PI' in the second storage unit 108. As explained previously, this is carried out using a suitable RDBMS. Once all payment instructions in the batch have been processed by the storage controller 104, the second stage may commence. During the second stage, the batch of payment instructions is extracted from the first or second storage unit, transmitted to the business logic unit 110 and suitable business logic processing is performed on each payment instruction in the batch by the business logic processor 306 of the business logic unit 110.

Advantageously, by separating the replication and storage processing and the extraction and business logic processing into two distinct processing stages, the first and second storage units 106, 108 effectively act as a buffer between the payment instruction generator 102 and business logic unit 110. Thus, any errors that occur during the business logic processing of the batch (which could potentially result in payment transactions occurring incorrectly—for example, some employees of an organisation not being paid their monthly salary) can be easily rectified by simply cancelling the business logic processing for the batch and restarting it. This is possible because the payment instructions PI, PI' themselves remain stored in the first and/or second storage units 106, 108 and have been subjected to only the amount of processing that is strictly necessary to check and safely store the payment instructions the RDBMS. The stored payment instructions PI, PI' therefore have high integrity and are unlikely to be corrupted in both the first or second storage units 106, 108, even in the case of a failure in the business logic. It is therefore possible to simply cancel faulty business logic processing and restart it using the stored payment instructions, thus easily avoiding any complications caused by erroneous business logic processing of the batch.

Furthermore, if a business logic fault is found to be associated with an error in the payment instruction batch data stored in the first storage unit 106, for example if the PI batch became corrupted in storage, then the business logic processing can be restarted using the replicated payment instruction batch stored within the second storage unit 108. In this case, the control unit 212 of the storage controller 104 causes the replicated payment instruction batch from the second storage unit 108 to be extracted and transmitted to the business logic unit 110 when the business logic processing is restarted.

A fault during the business logic processing is detected using the fault detector 312. The fault detector 312 uses known methods for detecting, for example, hardware or software faults during the processing of a payment instruction batch by the business logic processor 306 and determining whether or not such a fault may have been caused by an error in the payment instruction batch data. For example, the fault detector 312 may perform low level integrity checks in the hardware or business logic aware checks in the software (such as reconciliation logic). Once a fault has been detected by the fault detector 312, the re-extraction of the payment instruction batch and restarting of the business logic processing on the basis of the re-extracted payment instruction batch occurs under the control of the control unit 310 of the business logic unit 110 and the control unit 212 of the storage controller 104.

Figure 6:
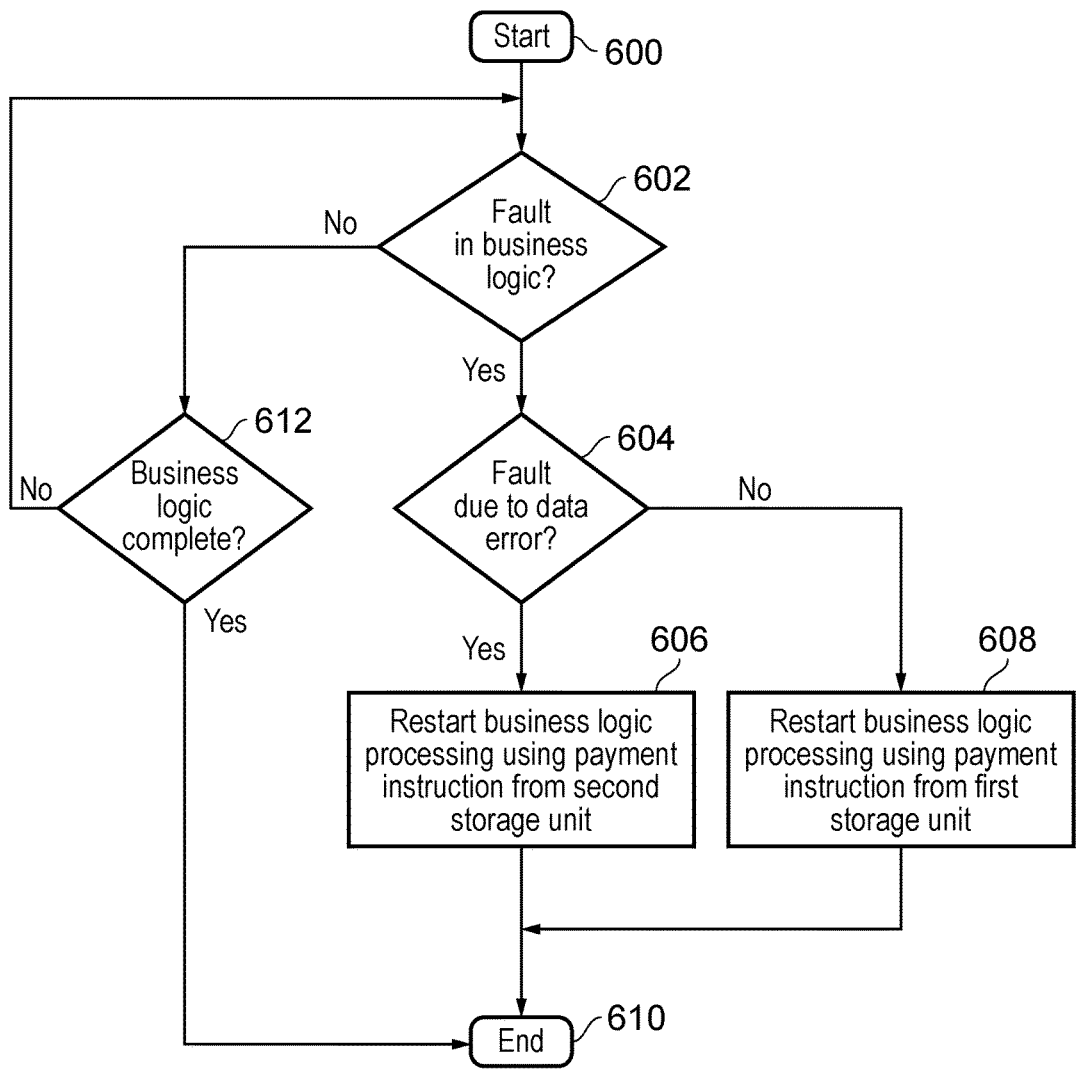
FIG. 6 describes a process for restarting the business logic processing following the detection of a fault according to an embodiment of the present invention.

FIG. 6 describes a process for restarting the business logic processing following the detection of a fault for a batch of payment instructions PI extracted from the first storage unit. The process of FIG. 6 is comprised within step 510 of FIG. 5 in which the business logic processing is performed. In the case of FIG. 6, it is assumed that the business logic processing is performed on the payment instruction PI stored in the first storage unit 106 following the check at step 504 of FIG. 5.

The process starts at step 600. At step 602, it is determined as to whether or not a fault in the business logic processing has occurred. If a fault has not occurred, then the process moves onto step 612, in which it is determined whether or not the business logic processing is complete. If the business logic processing is complete, then the process ends at step 610. However, if the business logic is not complete, then the process returns to step 602. On the other hand, if, at step 602, it is determined that a business logic fault has occurred, the process moves onto step 604.

At step 604, it is determined whether or not the fault in the business logic processing is due to an inherent error in the payment instruction batch data, for example an error caused by corrupted storage of the PI or a failed/incomplete or corrupted extraction of the PI. This is detected by the fault detector 312. If the fault in the business logic processing did not occur due to an inherent error in the payment instruction batch data, then the process moves onto step 608, in which the business logic processing is restarted using the batch of payment instructions PI stored in the first storage unit 106. On the other hand, if the fault in the business logic processing is found to be due to an error in the payment instruction batch data, for example if it became corrupted during storage, then the process moves onto step 606, in which the business logic processing is restarted using the replicated batch of payment instructions PI' stored in the second storage unit 108.

Once the business logic processing has been restarted, using either the batch of payment instructions PI stored in the first storage unit 106 or the replicated batch of payment instructions PI' stored in the second storage unit 108, the fault detection process ends at step 610.

It is noted that FIG. 6 has been described with respect to a batch of payment instructions. It is advantageous to restart the business logic processing on the entire batch in the event of a fault because it means that the business logic processor 306 only needs to be configured to implement logic for the entire batch, thus avoiding the additional complexity required for the implementation of partial batch processing logic. It is also advantageous because the end result of the business logic processing on the batch is exactly as expected by the user. This helps to avoid, for example, a scenario in which the results of the business logic processing are undesirably produced in incomplete parts (for example, for a set of company payroll instructions issued as a batch, it avoids one set of employees receiving their salary at a different time to another set of employees). The process of FIG. 6 can, however, also be applied to a single payment instruction PI so as to ensure that business logic processing on this single payment instruction PI occurs correctly. That is, the single payment instruction will not be transmitted to the business logic unit 110 for business logic processing until it has been successfully replicated and stored in both the first and second storage units 106, 108.

Thus, in embodiments, a replicated payment instruction PI' stored in the second storage unit 108 is used in place of the original payment instruction PI stored in the first storage unit either when the control unit 212 of the storage controller 104 determines that the original payment instruction PI is not available for business logic processing (due to a technical fault or natural disaster at the first storage unit 106, for example) or when a fault is detected during business logic processing by the fault detector 312 and is attributed to an error in the payment instruction batch data stored in the first storage unit 106. Although the likelihood of faults being introduced in the first storage unit 106 is low (due to the use of the RDBMS), any faults which do occur can thus be easily rectified by using the replicated payment instruction PI' stored in the second storage unit 108 in place of the original payment instruction PI stored in the first storage unit 106. It is thus ensured that, following the application of the business logic processing, the payment transaction instructed by the original payment instruction PI is carried out correctly.

In embodiments, the payment information stored in the information portion 116 of the payment instruction packet 114 indicates a payment date. This is a date which the sender of the payment instruction specifies as the date on which the payment transaction should be completed. If a payment instruction PI specifies a future date to the date on which it is transmitted to the storage controller 104, then the storage controller 104 will replicate and store the payment instruction PI and replicated payment instruction PI' in the usual way. However, the payment instruction PI, PI' will not be processed by the business logic unit 110 until the payment date indicated by the payment instruction PI, PI' has been reached.

It is noted that a corresponding arrangement will apply to a batch of payment instructions which all have the same future payment date. That is, the batch will not be processed until the payment date indicated by the payment instructions within the batch has been reached. For a batch of payment instructions which have different payment dates, then the control unit 212 divides the batch into a number of sub-batches each containing a set of payment instructions with the same payment date. Each sub-batch is then processed individually when its respective payment date is reached.

Advantageously, instructions for future payments can therefore be safely stored using the replication and storage processing of the storage controller 104, even though the specified date of the payment transaction is yet to occur.

Although the foregoing description is related to the processing of electronic payment instructions, it will be appreciated that any other type of data packet for which correct processing is important may also be processed using the above-described arrangement. That is, any type of data packet may be processed using the above-described arrangement so as to ensure that the data is available for processing, is only processed once and is processed correctly. The above described arrangement is particularly suited to types of data packets which are high in number, which must be as close to 100% correct as possible and which cannot be easily replicated (and which therefore make the traditional methods of ensuring correct processing, including obtaining feedback from the sender of the instruction and asking for the data to be retransmitted in the event of a processing fault, very impractical). For example, data packets generated from scientific experiments or complex computer simulations which have to be as close to 100% accurate as possible could be processed using the above arrangement. In this case, the payment instruction receiver 200 of the storage controller 104 would be replaced with a general data packet receiver and the business logic processor 306 of the business logic unit 110 would be replaced with a processor suitable for processing the type of electronic instruction that is received.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

The invention claimed is:

1. A device configured to process a payment instruction, comprising:
a communication interface operable to receive a payment instruction from a user, the payment instruction comprising payment details and an electronic signature, the electronic signature being destroyed if the content of payment instruction is altered;
a computer processor configured to check the presence of the electronic signature and confirming the integrity of the payment instruction when the electronic signature is present;
wherein in the event that the integrity of the payment instruction is confirmed, the computer processor is configured to:
store the payment instruction in a first storage using a relational database management system (RDBMS);
replicate the payment instruction and storing the replicated payment instruction in a second storage using the RDBMS;
transmit, via the communication interface, an acknowledgement signal to the user once the payment instruction has been successfully stored in the first storage and the replicated payment instruction has been successfully stored in the second storage;
determine whether or not the payment instruction stored in the first storage is available;
when the payment instruction stored in the first storage is available, extract the payment instruction from the first storage and perform further processing on the payment instruction;
when the payment instruction stored in the first storage is not available, extract the replicated payment instruction from the second storage and perform the further processing on the replicated payment instruction;
determine whether or not a fault has occurred in the further processing; and
when a fault is determined to have occurred, cancel the further processing, newly extracting the payment instruction from the first storage or replicated payment instruction from the second storage, and restart the further processing on the newly extracted payment instruction or replicated payment instruction.

2. A non-transitory computer readable medium including computer readable instructions which, when loaded onto a computer, configure the computer to perform a method comprising:
receiving a payment instruction from a user, the payment instruction comprising payment details and an electronic signature, the electronic signature being destroyed if the content of payment instruction is altered;
checking the presence of the electronic signature and confirming the integrity of the payment instruction when the electronic signature is present wherein in the event that the integrity of the payment instruction is confirmed, the method further comprises:
storing the payment instruction in a first storage using a relational database management system (RDBMS);
replicating the payment instruction and storing the replicated payment instruction in a second storage using the RDBMS before performing any further processing on the payment instruction;
transmitting an acknowledgement signal to the user once the payment instruction has been successfully stored in the first storage and the replicated payment instruction has been successfully stored in the second storage;
determining whether or not the payment instruction stored in the first storage is available;
when the payment instruction stored in the first storage is available, extracting the payment instruction from the first storage and performing further processing on the payment instruction;
when the payment instruction stored in the first storage is not available, extracting the replicated payment instruction from the second storage and performing the further processing on the replicated payment instruction;
determining whether or not a fault has occurred in the further processing; and
when a fault is determined to have occurred, cancelling the further processing, newly extracting the payment instruction from the first storage or replicated payment instruction from the second storage, and restarting the further processing on the newly extracted payment instruction or replicated payment instruction.

* * * * *